United States Patent [19]

Kohyama et al.

[11] 4,441,574
[45] Apr. 10, 1984

[54] REAR COVER DEVICE FOR MOTORCYCLES

[75] Inventors: Mikihiro Kohyama; Kozo Ohta, both of Saitama, Japan

[73] Assignee: Honda Giken Kogyo Kabushiki Kaisha, Tokyo, Japan

[21] Appl. No.: 380,893

[22] Filed: May 21, 1982

[30] Foreign Application Priority Data

May 21, 1981 [JP] Japan .................. 56-73946[U]
May 21, 1981 [JP] Japan .................. 56-73948[U]

[51] Int. Cl.³ .................................................. B62D 39/00
[52] U.S. Cl. .................................. 180/219; 224/32 A; 280/281 R; 296/37.1; 296/198
[58] Field of Search ............... 180/219, 218, 225, 228; 296/84 R, 37.1, 198; 224/32 R, 32 A; 280/281 R, 289 S

[56] References Cited

U.S. PATENT DOCUMENTS 2,237,677 4/1941 Lewis .................................. 180/219
2,491,062 12/1949 Shephard .......................... 224/32 R

FOREIGN PATENT DOCUMENTS 486335 11/1953 Italy ...................................... 180/219
306229 6/1955 Switzerland ......................... 180/219
348884 10/1960 Switzerland ......................... 180/219
819690 9/1959 United Kingdom ................. 180/225

Primary Examiner—Joseph F. Peters, Jr.
Assistant Examiner—Mitchell J. Hill
Attorney, Agent, or Firm—Irving M. Weiner; Pamela S. Burt; John L. Shortley

[57] ABSTRACT

A rear cover device in a motorcycle having an engine disposed substantially in front of a rear wheel, a muffler at one side of the rear wheel, and a rear wheel support member and a shock absorber at the other side of the rear wheel. The device comprises a cover member which covers the rear wheel from above and also covers portions of both sides of the rear wheel while accommodating the shock absorber therewithin, and a container member constructed integrally with the cover member and extending inside the cover member above the muffler.

A dead space can be substantially eliminated from the rear cover device, and therefore substantially the entirety of the interior space can be utilized.

15 Claims, 13 Drawing Figures

REAR COVER DEVICE FOR MOTORCYCLES

BACKGROUND OF THE INVENTION

1. Field of the Invention

The present invention relates to a rear cover device for motorcycles and more particularly to a rear cover device for motorcycles wherein a rear wheel support member and a shock absorber on one hand and an exhaust muffler on the other hand are substantially separated so as to be disposed on the right and left sides of a rear wheel.

2. Description of Relevant Art

Motorcycles, particularly scooter type motorcycles, are generally provided with a rear cover which covers an engine and a rear wheel. A rear wheel suspension system in motorcycles which has heretofore been widely used comprises a power unit swinging type suspension system wherein an engine and a transmission case are integrated to constitute a power unit, a rear wheel is supported by the rear part of the transmission case, the transmission case and a vehicle body frame are connected through a single rear cushion unit, and a front portion of the power unit is pivoted to the vehicle body frame for swinging motion relative thereto. In such a suspension system, the engine is normally disposed on the axis of the vehicle body, but the transmission case and the rear cushion unit are disposed on one side of the rear wheel and a muffler extends on the other side. Consequently, if substantially the entirety of such a suspension system and the rear wheel, are desired to be covered a rear cover device is required to cover the rear cushion unit and the transmission case on either the right or left side of the rear wheel and at the same time to cover the other side almost symmetrically for balancing purposes. However, such an arrangement has attendant disadvantages inasmuch as, for example, a dead space is formed above the muffler which usually is disposed on the latter side.

The present invention effectively overcomes the aforesaid disadvantages associated with conventional motorcycle rear cover devices of the aforesaid construction.

SUMMARY OF THE INVENTION

According to the present invention there is provided a rear cover device in a motorcycle having an engine disposed substantially in front of a rear wheel, an exhaust muffler substantially on one side of the rear wheel, a power unit comprising the engine and a transmission case, the power unit being connected for swinging motion at one end thereof to a vehicle body frame and supporting the rear wheel at the other end thereof, and a shock absorber disposed between the transmission case and the vehicle body frame. At least a part of the transmission case and the shock absorber are disposed substantially on the other side of the rear wheel. The rear cover device comprises a cover member which substantially covers the rear wheel from above and which extends downwardly so as to cover an outside portion of the rear wheel at the aforesaid one side and an outside portion of the shock absorber at the aforesaid other side, and a container member constructed integrally with the cover member and extending inside the cover member and above the exhaust muffler.

It is an object of the present invention to provide a rear cover device in a motorcycle having an engine disposed substantially in front of a rear wheel, an exhaust muffler substantially on one side of the rear wheel, as well as a power unit connected for swinging motion at one end thereof to a vehicle body frame and supporting the rear wheel at the other end thereof, and a shock absorber disposed between the power unit and the vehicle body frame, at least a part of the power unit and the shock absorber being disposed substantially on the other side of the rear wheel. In this manner, a dead space can substantially be eliminated, thus permitting utilization of substantially the entirety of the inside space, and radiation from the exhaust muffler toward the driver is effectively blocked.

It is another object of the present invention to provide a rear cover device in motorcycles of the above-mentioned construction, wherein maintenance is facilitated, particularly the maintenance around a rear wheel, and which has an enhanced rigidity and improved external appearance.

It is a further object of the present invention to provide a rear cover device for motorcycles capable of attaining the above-mentioned objects with a simple construction and at low cost.

A preferred embodiment of the present invention will be described hereinbelow with reference to the accompanying drawings, from which the above and other objects, features and advantages of the invention will become apparent.

DETAILED DESCRIPTION OF A PREFERRED EMBODIMENT

Figure 1:
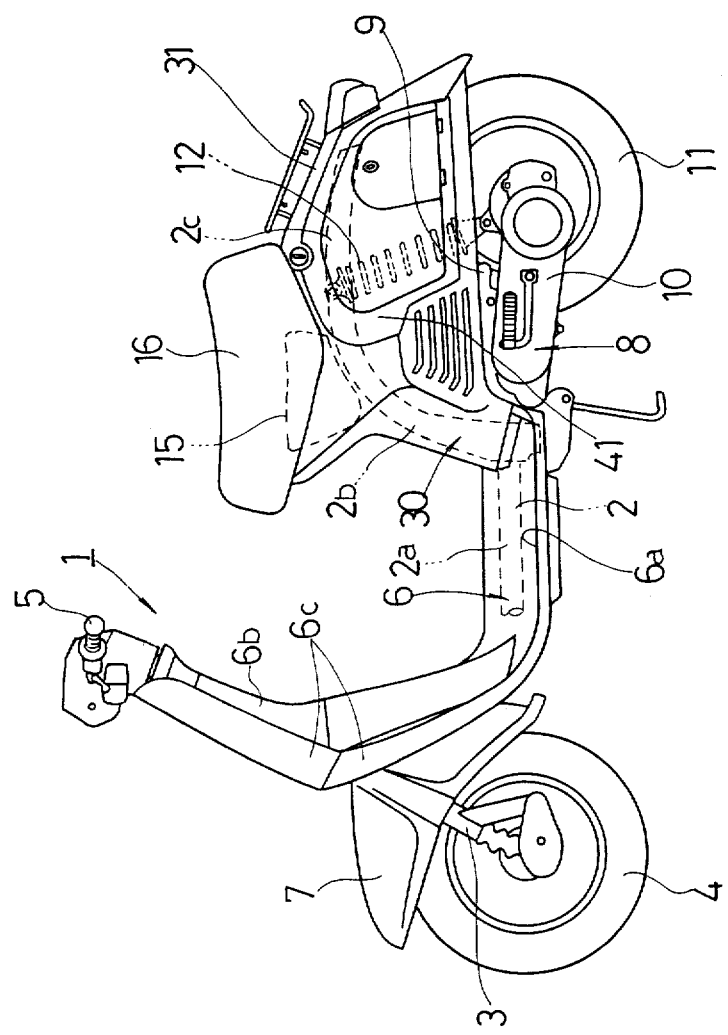
FIG. 1 is a left side view of a motorcycle having a rear cover device embodying the present invention.
Figure 2:
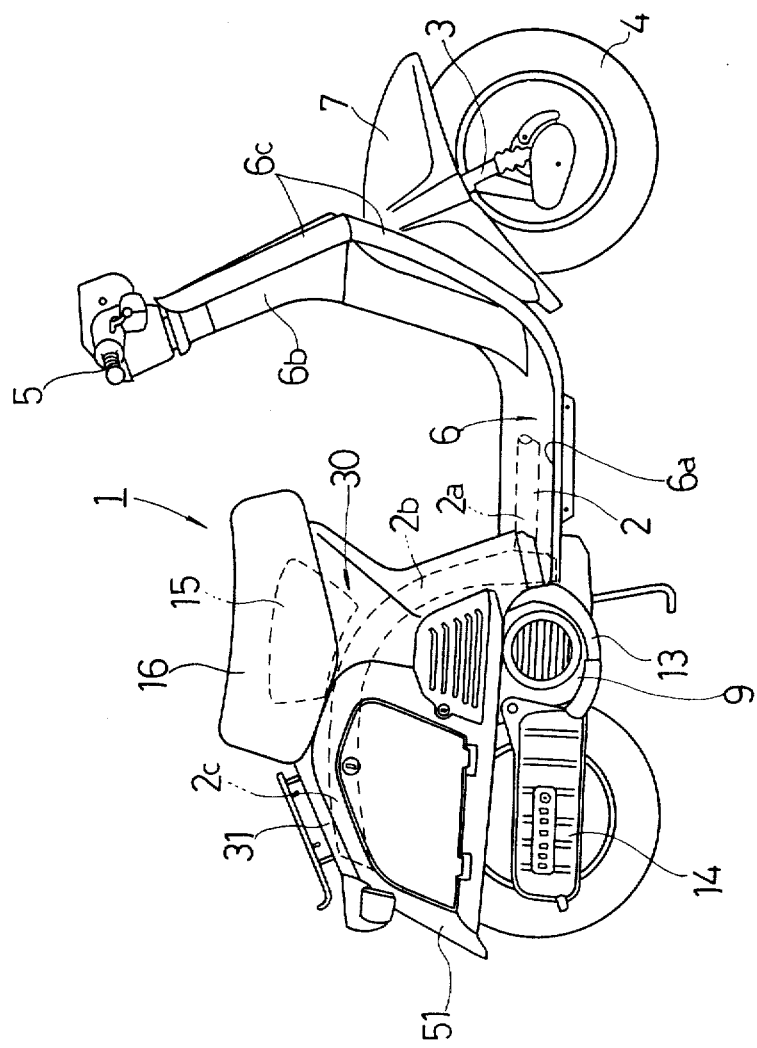
FIG. 2 is a right side view of the motorcycle of FIG. 1.

Referring first to FIGS. 1 and 2, there is shown a scooter type motorcycle 1 which has a vehicle body frame 2. The frame 2 supports through a head tube (not shown) at its front end a front fork 3 which is a support member for a front wheel 4, the front fork 3 being connected to a handlebar 5 through a steering stem (not shown). A front portion 2a of the frame 2 is covered with a front cover 6 which comprises a step 6a, a heat tube cover 6b and a leg shield 6c. Mounted above the front wheel 4 is a front fender 7.

The frame 2 further includes an upright portion 2b extending upwardly from the front portion 2a and a rear portion 2c extending rearwardly from an upper part of the upright portion 2b. Behind the front portion 2a there extends rearwardly a power unit 8 having the front end portion thereof pivoted to the lower end of the upright portion 2b. The power unit 8 is provided at its front portion with an engine 9 which is disposed such that its center lies substantially on the axis of the vehicle body. On one side of the engine 9 is integrally disposed a transmission case 10 which extends rearwardly, and inside a rear portion of the transmission case 10 is mounted and supported a rear wheel 11 which is disposed on the axis of the vehicle body. Thus, the transmission case 10 is biased to one side, to the left side in this embodiment, with respect to the axis of the vehicle body. A single rear shock absorber or cushion unit 12 is disposed between the rear portion of the transmission case 10 and one side, i.e., the left side in this embodiment, of the rear portion 2c of the frame 2, thus providing a cantilever type rear cushioning. On the other hand, on the other side or right side of the engine 9 there extends an exhaust pipe 13 of the engine, and a muffler 14 is connected to the downstream side of the exhaust pipe 13. The muffler 14 and the transmission case 10 are of substantially the same height, with the rear wheel 11 disposed therebetween, i.e., both are mounted in positions substantially symmetrical with respect to the rear wheel 11. A fuel tank 15 is mounted and fixed above the upright portion 2b of the frame 2 and a seat 16 is supported thereover.

The internal mechanism around the rear wheel 11 of the motorcycle 1 is substantially covered with a rear cover 30. The rear cover 30 covers the entirety of the upright portion 2b and rear portion 2c of the frame 2, the upper portion of the rear wheel 11, etc. Rear cover 30 comprises an upper cover 31 which covers longitudinally above the rear portion 2c of the frame 2, and right and left side covers 41 and 51 which cover the upright portion 2b, side portions of the upper cover 31 and both upper side portions of the rear wheel 11. The upper cover 31 and the side covers 41 and 51 are each independently removable.

Figure 3:
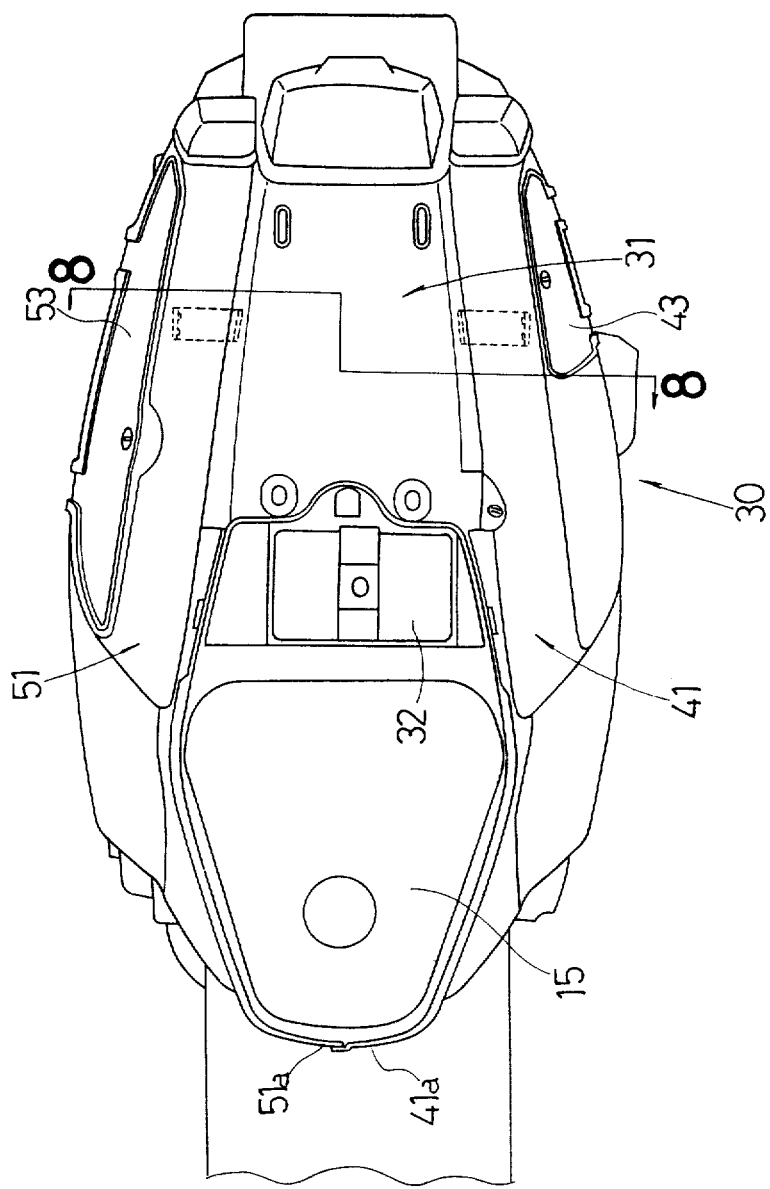
FIG. 3 is an enlarged plan view of a rear half portion of the motorcycle of FIG. 1, with a seat removed.
Figure 4:
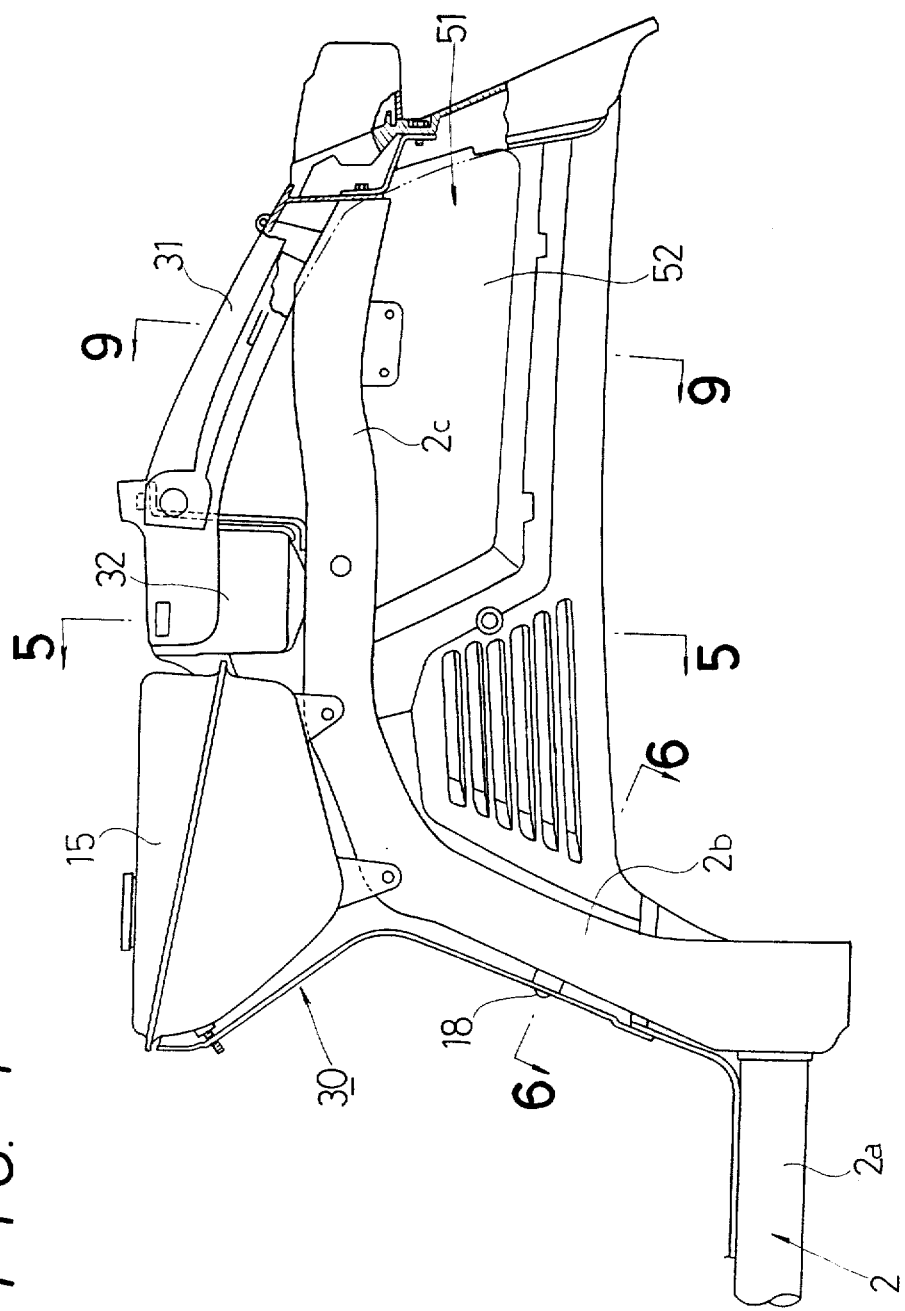
FIG. 4 is a longitudinally sectioned enlarged left side view illustrating the relation between a rear-half portion of a frame of the motorcycle of FIG. 1 and the rear cover device.
Figure 5:
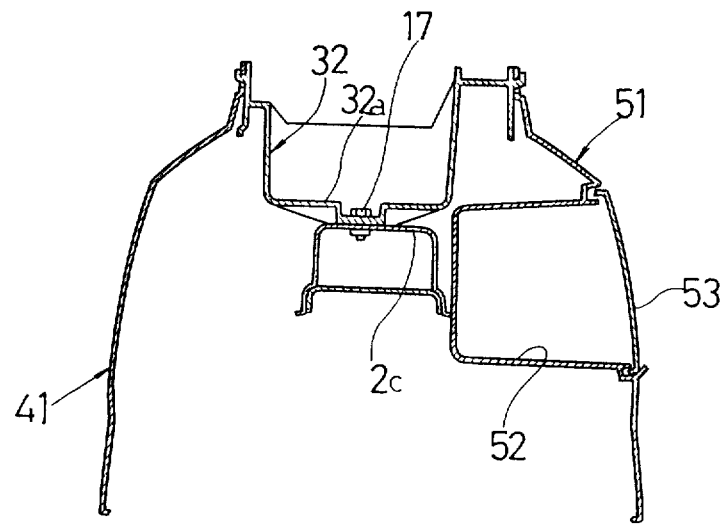
FIG. 5 is a sectional view of a principal part taken along line 5—5 of FIG. 4.
Figure 6:
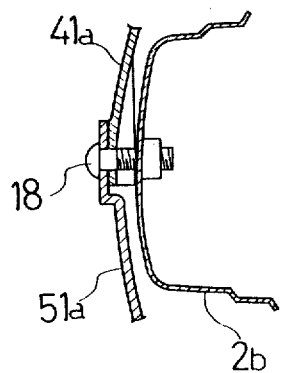
FIG. 6 is a sectional view of a principal part taken along line 6—6 of FIG. 4.

Referring to FIGS. 3 through 8 and first to FIGS. 3 through 5, the upper cover 31 is provided at its front portion with a downwardly recessed portion 32, and through a bottom piece 32a of the recess 32 the upper cover 31 is fixed to an intermediate part of the rear portion 2c of the frame 2 by means of a machine screw 17 or the like. As shown in FIGS. 3 and 6, the side covers 41 and 51 are provided at front portions thereof with inwardly bent portions 41a and 51a, respectively, and opposed ends of these bent portions are overlapped and fixed with a machine screw 18 to the front face of the upright portion 2b of the frame 2, thus covering the upright portion 2b and the front face of the fuel tank 15 disposed thereover.

Figure 7:
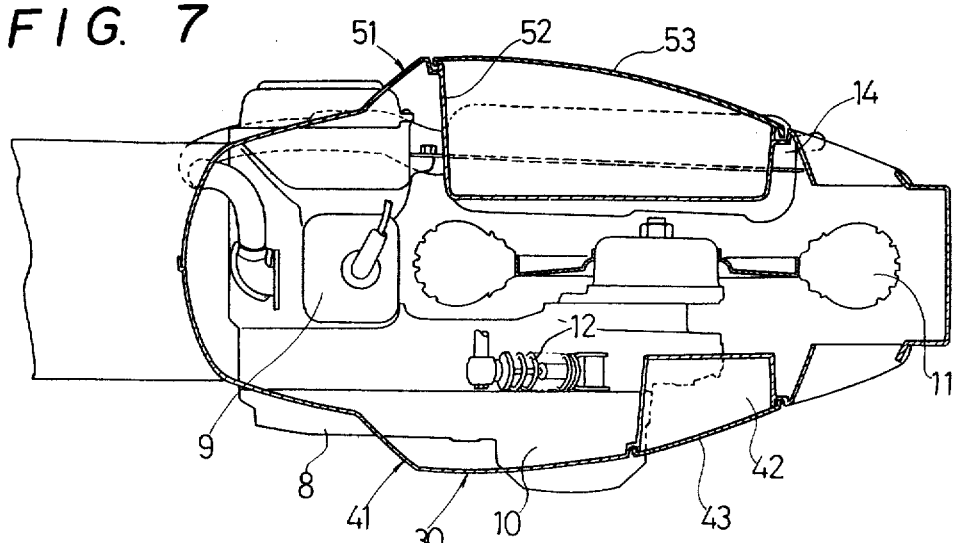
FIG. 7 is a longitudinally sectioned plan view of the rear-half portion of the motorcycle shown in FIG. 3.
Figure 8:
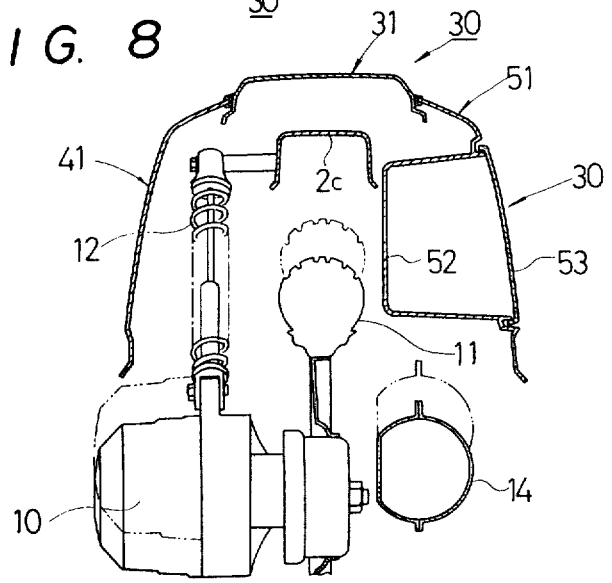
FIG. 8 is a sectional view of a principal part taken along line 8—8 of FIG. 3.

As clearly shown in FIGS. 3, 7 and 8, the rear cushion unit 12 is disposed so as to extend obliquely downwardly within the left side cover 41 from front to intermediate portions of the latter, such that cover 41 is mounted so as to cover the outside of intermediate and upper portions of the rear cushion unit 12, and the right side cover 51 is mounted so as to cover a side portion of the rear wheel 11 while curving outwardly symmetrically with respect to the left side cover 41.

The right side cover 51 is integrally provided with an inwardly extending container 52 formed within a space above the muffler 14. The container 52 has an outward opening to which is fitted a lid 53 capable of opening and closing so that the outer surface of the lid 53 is flush with that of the cover 51. Furthermore, in a rear inside space of the cover 41 not interferring with the rear cushion unit 12, the cover 41 extends inwardly to integrally form a container 42 of a smaller capacity, the container 42 having an outward opening to which is fitted a lid 43 capable of opening and closing so that the outer surface of the lid 43 is flush with that of the cover 41.

Figure 10:
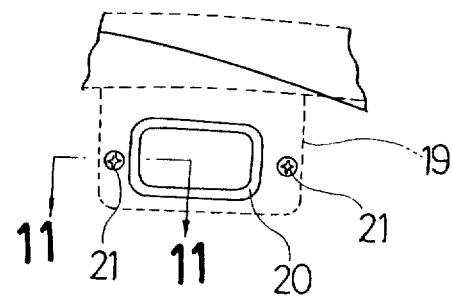
FIG. 10 is an enlarged right side view illustrating the relation between the frame and a right-hand container of the rear cover device shown in FIG. 9.
Figure 11:
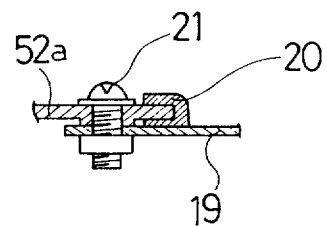
FIG. 11 is a sectional view taken along line 11—11 of FIG. 10.
Figure 9:
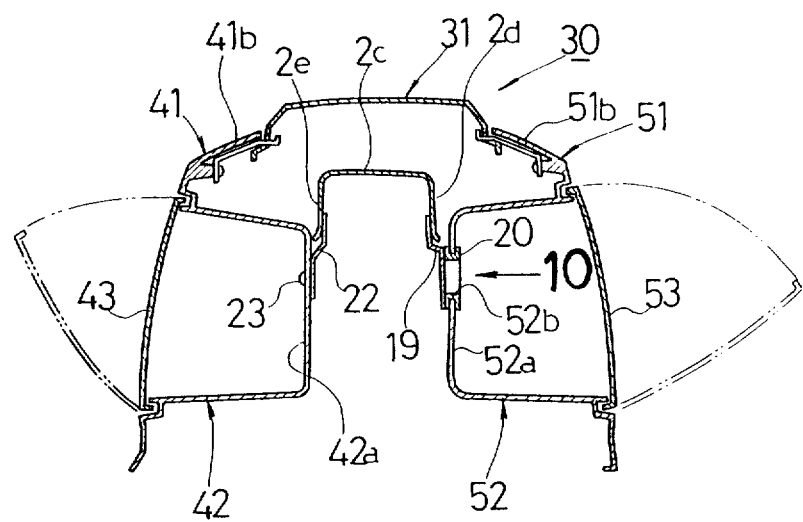
FIG. 9 is a sectional view of a principal part taken along line 9—9 of FIG. 4.

Referring now to FIGS. 9 through 11, a mounting piece 19 is firmly attached to a right side portion 2d of the rear portion 2c of the frame 2 so as to rigidly project therefrom, while in an inner wall 52a of the container 52 opposed to the mounting piece 19 is formed a small window 52b surrounded with a sealing material 20 fitted in the inner wall 52a, and in positions before and behind the small window 52b the inner wall 52a is fixed to the mounting piece 19 with machine screws 21, whereby the cover 51 is secured to the frame 2. On the portion of the mounting piece 19 surrounded by the small window 52b and facing the inner space defined by the container 52 is set forth a production or identification number of the vehicle body so that such number can be seen by opening the lid 53. On the other hand, an inner wall 42a of the container 42 is fixed with a machine screw 23 to a mounting piece 22 projecting rigidly from a left side portion 2e of the rear portion 2c of the frame 2, whereby the left side cover 41 is secured to the frame 2. Upper portions 41b and 51b of the side covers 41 and 51 are removably jointed with left and right ends, respectively, of the upper cover 31 by engagement in a concave and convex manner or by a hole engagement.

Figure 12:
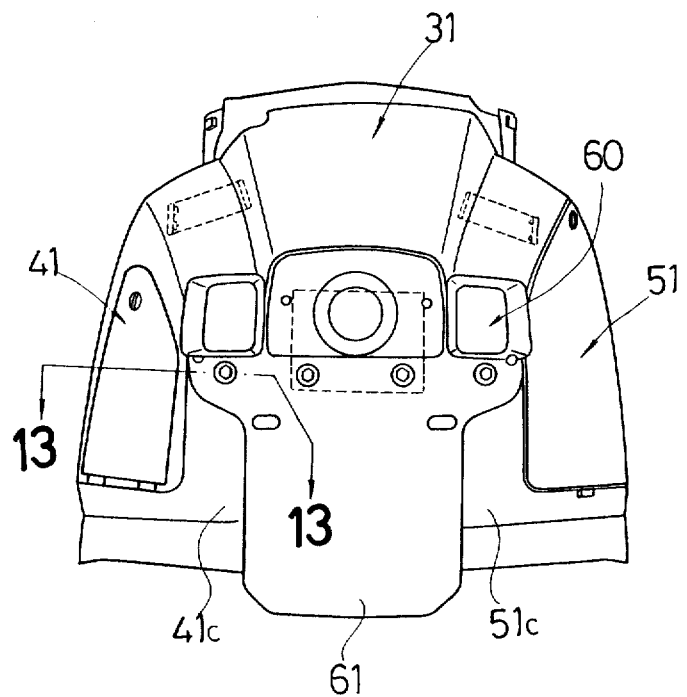
FIG. 12 is an enlarged rear view of the rear cover device shown in FIG. 1.
Figure 13:
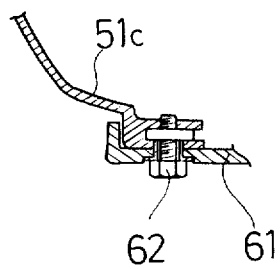
FIG. 13 is an enlarged sectional view of a principal part taken along line 13—13 of FIG. 12.

Referring now to FIGS. 12 and 13, rear portions of the left and right side covers 41 and 51 are bent inwardly and spaced from each other, and between their rear end portions 41c and 51c is mounted a rear plate 61 which supports a rear light unit 60, etc., and left and right portions of the rear plate 61 are fixed by means of machine screws 20 to the rear end portions 41c and 51c, the lower portion of the rear plate 61 also serving as a bracket for a license plate.

Although the motorcycle used in the above embodiment is a scooter type, the type of motorcycle is selective.

The container 42 is not always needed, and may be provided optionally. Because of its small capacity, the container 42 is suitable for tools and other small articles.

What is claimed is:

1. In a motorcycle including: a power unit comprising an engine and a transmission case, said power unit having a front portion thereof pivotably connected to a body frame of said motorcycle for swinging motion relative thereto, and said engine being disposed on the axis of said body frame; a rear wheel supported by a rear part of said transmission case; a single rear shock absorber which connects said transmission case to a body frame of said motorcycle; said transmission case and said rear shock absorber being disposed on a first side of said rear wheel; and an exhaust muffler disposed on a second side of said rear wheel, a rear cover device comprising:

a cover member which covers said rear wheel from above and extends substantially downwardly while covering an outside portion of said shock absorber at said a first side and an outside portion of said rear wheel at said second side; and a container member formed integrally with and extending inwardly of said second side of said cover member, said container member being disposed above said exhaust muffler.

2. A rear cover device according to claim 1, wherein said cover member comprises an upper member which substantially covers said rear wheel from above and first and second side members which substantially cover said first and second sides of said rear wheel, respectively, and said container member is fixed to said second side member.

3. A rear cover device according to claim 2, wherein said upper member and said first and second side members are detachably connected.

4. A rear cover device according to claim 2, wherein said upper member and said first and second side members are each detachably fixed to said body frame.

5. A rear cover device according to claim 2, wherein said container member at least partially defines a space which opens to the outside of said rear wheel, said space being closed with a lid member capable of opening and closing so that the outer surface of said lid member is substantially flush with the outer surface of said second side member.

6. A rear cover device according to claim 5, wherein:
said space is defined partially by a mounting piece projecting rigidly from said body frame, with a production or identification number of said motorcycle being set forth on a portion of said mounting piece facing said space.

7. A rear cover device according to claim 6, wherein said container member is fixed to said mounting piece.

8. A rear cover device according to claim 2, wherein said first side member has a container member fixed thereto and extending inwardly of said cover member.

9. A rear cover device according to claim 8, wherein said second container member defines a space which opens to the outside of said shock absorber, said space being closed with a lid member capable of opening and closing such that the outer surface of said lid member is substantially flush with the outer surface of said first side member.

10. A rear cover device according to claim 8, wherein:
said second container member is fixed to a mounting piece projecting rigidly from said body frame.

11. A rear cover device according to claim 8, wherein said container member is relatively long in the longitudinal direction of the body, and said second container member is relatively short in said longitudinal direction.

12. A rear cover device according to claim 8, wherein:
said second container member extends rearwardly of said shock absorber and above a portion of said power unit.

13. A rear cover device according to claim 1, wherein said cover member has an external form substantially symmetrical with respect to the surface of revolution of said rear wheel.

14. A rear cover device according to claim 1, wherein said power unit is capable of swinging integrally with said exhaust muffler.

15. A rear cover device according to claim 1, wherein said motorcycle is of a scooter type.

* * * * *